Figure 1:
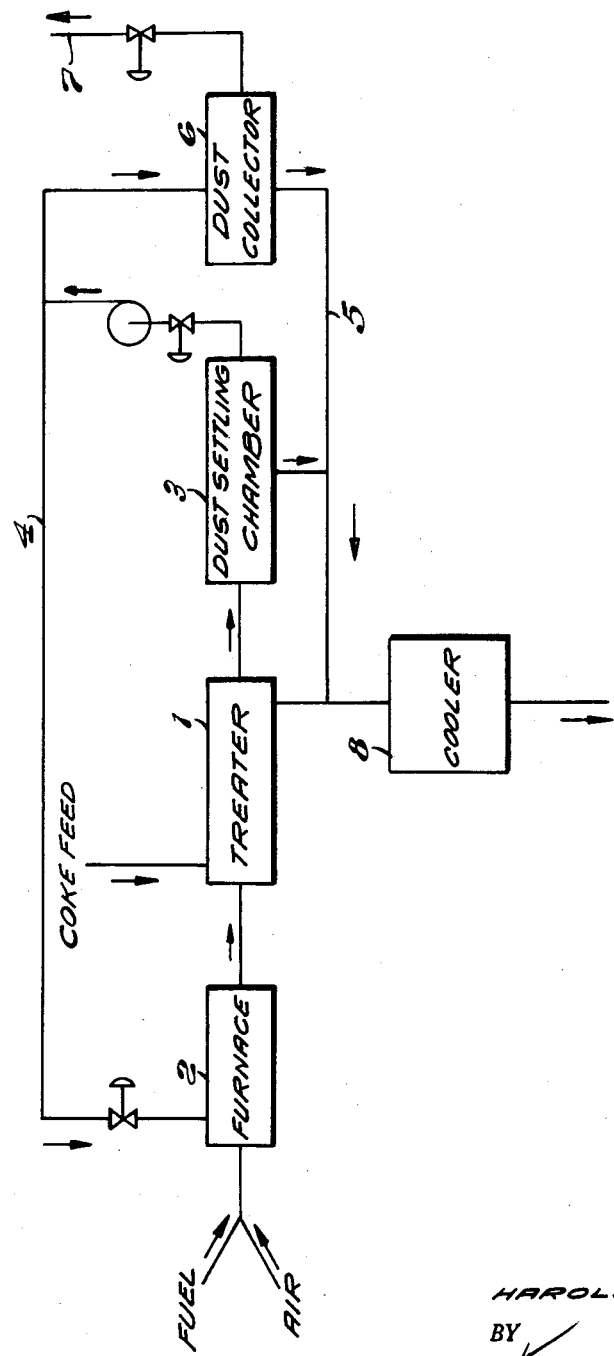

July 17, 1956 H. REINTJES 2,755,234
PROCESS FOR MAKING PETROLEUM COKE NON-AGGLUTINATING
Filed July 16, 1954 2 Sheets-Sheet 1

INVENTOR.
HAROLD REINTJES
BY Kenneth W. Brown, Atty

July 17, 1956   H. REINTJES   2,755,234
PROCESS FOR MAKING PETROLEUM COKE NON-AGGLUTINATING
Filed July 16, 1954   2 Sheets-Sheet 2

INVENTOR.
HAROLD REINTJES
BY
Kenneth W Brown, Atty

United States Patent Office 2,755,234
Patented July 17, 1956

2,755,234

PROCESS FOR MAKING PETROLEUM COKE NON-AGGLUTINATING

Harold Reintjes, Short Hills, N. J., assignor to Godfrey L. Cabot, Inc., Boston, Mass., a corporation of Massachusetts Application July 16, 1954, Serial No. 443,733

2 Claims. (Cl. 202—31)

This invention relates to a process for treating high volatile green petroleum cokes to substantially eliminate their property of agglutinating at calcination temperatures, and includes within its scope a novel process for calcining such normally agglutinating cokes.

This application is a continuation-in-part of my copending application, Ser. No. 408,887 filed February 8, 1954. The invention of this application constitutes an improvement over that described and claimed in my copending assigned application Ser. No. 112,839, filed August 27, 1949 and now forfeited.

Petroleum coke is extensively used in industry, notably as the major constituent of carbon electrodes as packing material in the baking of carbon electrodes and in metallurgy. The greatest proportion of petroleum coke currently available is the product of delayed coking of heavy refinery residual oils and tars. This coke is not pure carbon, but is believed to be a complex substance composed of graphitic crystallites embedded in a matrix of heavy hydrocarbon compounds. The overall carbon-hydrogen ratio of the green coke is about 24:1 or nearly so. The coke is wholly unsuitable for the uses mentioned above, and must be calcined. In this step, the hydrocarbons are converted by pyrolysis to carbon and volatile matter. The green coke sometimes absorbs a small amount of lighter hydrocarbon material during its original formation. This material is also driven off during the calcination operation and is included with that evolved during pyrolytic decomposition of the hydrocarbon coke. These volatilized products—commonly referred to as volatile matter—amount to about 10–15% of the green coke and include tarry matter, light hydrocarbon gases, and hydrogen. The calcined coke is substantially pure carbon plus inorganic impurities. The graphitic crystallites have increased in number and size and resemble more nearly the true graphite structure which would be produced if the heat treatment were carried to a higher temperature level.

In the course of calcination, the green coke of the type under discussion passes through a plastic state which causes fusing together of the aggregates. Consequently, it has heretofore been necessary to carry out the calcination in rotating drums wherein the coke is sufficiently agitated to inhibit sticking to walls and agglutination into large aggregates. Since high temperatures are required the drums are heated by an open flame. This procedure results in substantial coke loss, and also in loss of the volatile matter produced during treatment.

Clearly it is highly desirable that means other than rotary calcination for treating high volatile green cokes to increase their utility should be available to industry. Particularly is this so when such cokes may be just as effectively treated for some uses by means considerably less drastic than calcination. For example, were it not for the agglutinating properties of most green petroleum cokes any of them could be used as packing material in carbon electrode baking furnaces. As it is, substantial proportions of expensive calcined coke must be blended with the green coke to prevent fusing and sticking in the furnaces. Likewise, other and better means of calcining green coke, such as that described hereinafter, could be employed if the coke did not agglutinate on heating to calcining temperature.

It is accordingly the principal object of this invention to provide a novel process for substantially completely destroying the agglutinating properties of green cokes. It is also an object of this invention to provide such a process whereby mild heating of high volatile green petroleum coke in a slightly oxidizing atmosphere without calcination will prevent the coke from thereafter agglutinating.

I have discovered that any high volatile, normally agglutinating green coke can be made nonagglutinating by the following process. The coke is maintained in a treating zone for at least about 3 hours. Hot combustion gases containing a slight excess of oxygen, preferably not over about 6% by volume, are introduced into the treating zone at a temperature of about 750°–1050° F. at a rate of flow such that the exit temperature of the gases will range between about 600°–800° F. and the coke will be heated to about 700–800° F. As thus treated the coke will be made substantially nonagglutinating and can then be packed about carbon electrodes for baking or passed through a vertically-disposed externally heated calcination zone maintained at the required carbonization temperature.

The operating conditions are somewhat critical in this novel process. It is essential that the coke be heated sufficiently for reaction with the free oxygen in the treating atmosphere but not to so high a temperature that excessive amounts of coke will be destroyed by burning or that excessive valuable volatile constituents will be driven off and likewise be lost. Consequently, the coke should not be heated to above about 800° F. and preferably not above about 725° F. Further the free oxygen in the treater should be limited to the amount necessary to deagglutinate the coke without excessive combustion. Hence it is preferred to provide a pretreater atmosphere having an oxygen content of about 3–6% by volume, although a somewhat greater concentration is tolerable, and as little as 1% is operable.

The atmosphere in the reating zone may be generated by any convenient means. The simplest procedure is to burn a combustible fuel with a slight excess of air in a furnace and to flow the hot combustion products directly into the treating zone. The temperature of these combustion products can readily be accurately controlled by recycling a portion thereof from the treating zone into the generating furnace or into the flue between furnace and treater. Other means of obtaining hot gases will be evident to those skilled in the art.

Upon discharge from the treating zone the coke, now free from agglutinating properties, may be stored for later use or may be conducted to a vertical calcination zone while still hot to conserve its sensible heat as described and claimed in my said copending application, Ser. No. 408,887. In this calcination zone, from which air and contaminating gases are excluded, the carbonization will be completed at elevated temperatures, preferably above about 2000° F. Calcined coke is continuously discharged from the bottom of the zone as pretreated green coke is delivered to the top thereof. Volatile by-products are likewise recovered from the upper region of the calcination zone.

Figure 3:
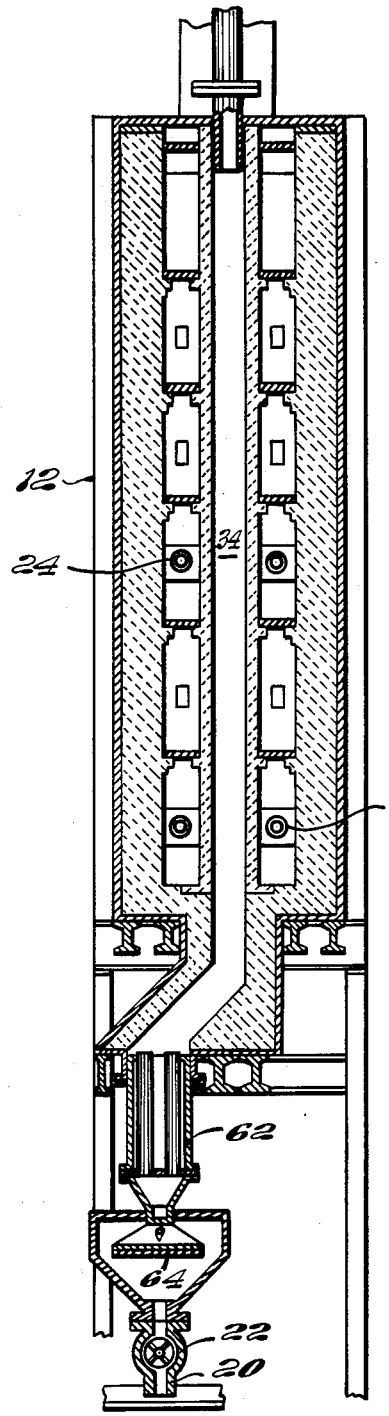
Figure 2:
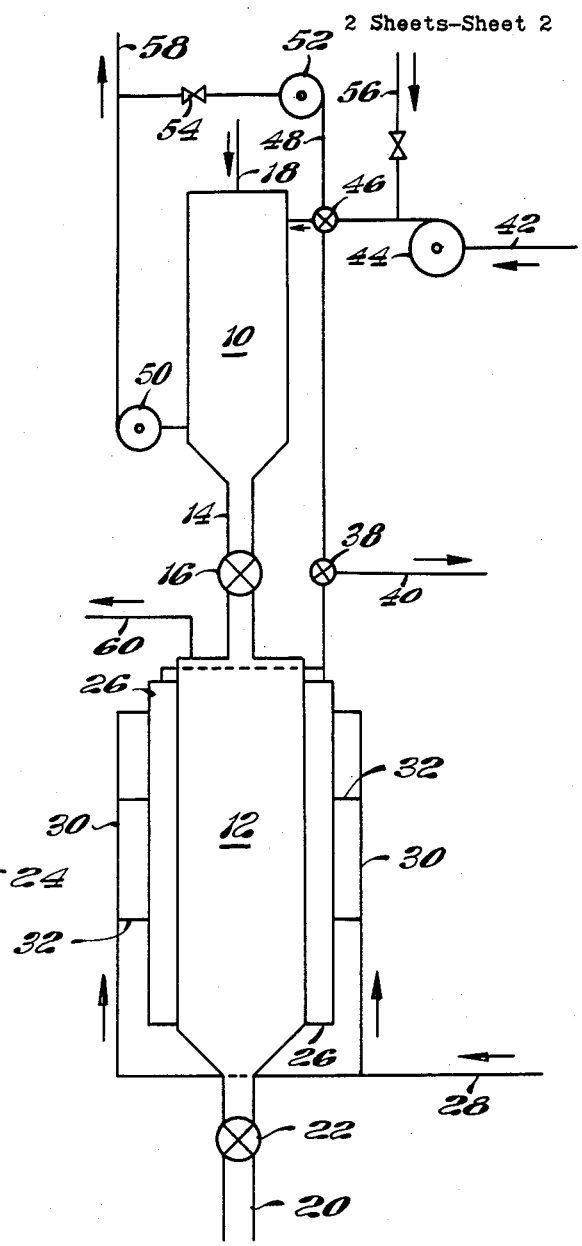

My invention will better be understood and appreciated from the following description thereof taken in connection with the accompanying drawings of one embodiment of apparatus in which it may conveniently be carried out in which Fig. 1 is a flow diagram of the process, Fig. 2 is a diagrammatic view in side elevation of a unitary pretreater-calciner, and Fig. 3 is a view in vertical cross section of one type of vertical retort in which the calcination step of the process may advantageously be carried out.

In the flow diagram of Fig. 1 raw green coke is delivered to the treater 1 where it is retained for the requisite period of time. Hot combustion gases generated in furnace 2 flow over and/or through the bed of coke in treater 1 and thence into a dust settling chamber 3. From there a portion will ordinarily be recycled to the furnace through pipe 4 and the remainder may be used as a dust carrier in dust collection line 5. A dust collector 6 may also be provided for convenience. Unused gases are vented from the system through stack 7. The treated coke is recovered through cooler 8 or may be delivered directly uncooled to the electrode baking bed or to the vertical calciner as hereinafter described.

That embodiment of my novel invention in which the complete carbonization of green coke is effected is shown in Figs. 2 and 3, numeral 10 designates the pretreater and 12 the vertical calciner, the latter being shown in detail in Fig. 3. Pretreater 10 and calciner 12 are connected by conduit 14 provided with a seal type metering valve 16 such as a star valve. A coke supply conduit 18 equipped with a suitable seal (not shown) is provided at the top of the pretreater and a product discharge conduit 20 with a seal valve 22 is connected to the bottom of the calciner. Thus is provided a single apparatus unit in which green coke flows continuously downward through pretreater and calciner.

Hot gases for pretreating the coke are provided from the calciner burner flues as follows. A mixture of combustible gas and air is delivered to burners 24 (Fig. 3) in burner flues 26 from main 28, connecting manifolds 30 and branch pipes 32. Combustion products heat the walls of the calciner shaft 34 (Fig. 3) and are conducted through flue 36 preferably to the upper zone of pretreater 10. Valve 38 and exhaust flue 40 are provided to dispose of excess gases.

Since some free oxygen is required to treat the green coke a conduit 42 and fan 44 are provided through which air or other oxygen-containing gas is pumped. Conduit 42 connects into flue 36 through mixing valve 46 into which is also connected recycle conduit 48. This recycle conduit is in turn connected into the lower section of pretreater 10 and is provided with fans 50 and 52 and pressure control valve 54 by means of which the volume of recycle treating gas is controlled. If desired, steam or water may be supplied to the pretreater through pipe 56. Excess gas from the pretreater is discharged from the system through stack 58. Volatiles driven from the coke during calcination are recovered through conduit 60.

One suitable type of calciner is shown in more detail in Fig. 3. This apparatus comprises a vertical shaft 34 having walls of refractory brick and being rectangular in cross section. The shaft is heated on its two long sides by burners 24 which fire into a flue system having baffles positioned above the burners in such manner that the combustion products travel a serpentine course and heat the entire area of the shaft walls. The pretreated green coke flows into the top of the shaft and is held at the bottom until the bed of coke substantially fills the shaft. As calcination takes place the finished product is withdrawn through valve 22 after passing through cooling section 62 and over distributor plate 64.

As any suitable vertical calciner can be used for the practice of the process of my invention no further description of the calciner appears necessary.

EXAMPLE 1

Green delayed coker petroleum coke having a volatile content of 14% and containing 5% adsorbed water was delivered to the treater 1 at the rate of 2000 lbs. per hour, the treater being a rotating drum having sufficient capacity to provide a coke residence time at that feed rate of 3 hours. Natural gas and air were supplied to furnace 2 at the rate of 10 and 115 cu. ft./min. respectively, and product gases at 600° F. were recycled to the furnace at 4600 cu. ft./min. 6600 C. F. M. of combustion product gases were thus delivered to treater 1 at a temperature of 950°. These gases analyzed as follows: $O_2$–3%, $CO_2$–8%, $H_2O$–21%, $N_2$–68%. By-product gases left treater 1 at 650° and coke was discharged therefrom at 700°. The coke product was found to be completely free from water, had a volatile content of 11% and was completely nonagglutinating.

Four treating runs preliminary to calcination in a vertical calcining unit were made in a Roto Louvre drier with the results set forth in the following example.

EXAMPLE 2

Four runs were made, two in a commercial size drier and two in a pilot model, in which green petroleum coke having an initial volatile content of 13.6% was continuously charged to the drier drum while hot combustion product gases containing an excess of oxygen were passed through the drum at temperatures ranging from about 750° to 1060° F. Water sprays were employed for the high temperature runs to control the temperature of the treating gases. Conditions were as follows:

*Table I*

PRETREATING OF PETROLEUM COKE

| Run | A | B | C | D |
|---|---|---|---|---|
| Treating Gas Inlet Temp., ° F. | 1,060 | 1,060 | 750 | 1,000. |
| Treating Gas Flow Rate, C. F. M. | 5,000 | 5,000 | 800 | 1,000. |
| Treating Gas Composition, Vol. Percent: | | | | |
| Oxygen | 3 | 3 | 17 | 5. |
| Carbon Dioxide | 6 | 6 | 2 | 6. |
| Water Vapor | 41 | 41 | 4 | 25. |
| Nitrogen | 50 | 50 | 77 | 64. |
| Rate of Coke Flow, lbs./hr. | 1,000 | 1,200 | 18 | 36. |
| Coke Retention Time, hrs. | 3 | 2.5 | 6 | 3. |
| Final Coke Temp., ° F. | 710 | 690 | 660 | 710. |
| Coke Volatile Content, Percent After Treatment. | 10 | | | |
| Agglutinating Properties. | Completely destroyed. | Reduced. | Reduced. | Completely destroyed. |

It will be noted that the product of runs B and C was not satisfactory because it still retained its agglutinating properties. It thus appears, contrary to expectation, that the treating temperature of the process is extremely critical since, as demonstrated by run C, a long residence time (6 hrs.) and considerable excess of oxygen (17%) did not compensate for the temperature deficiency.

Following treatment the coke was delivered to the top of a vertical calciner of the type illustrated in Fig. 3 of the appended drawings having an average heated wall temperature of 2500° F. Conditions were as follows:

*Table II*

| Run | 1 | 2 |
|---|---|---|
| Feed rate, lbs./hr | 370 | 453 |
| Discharge rate, lbs/hr | 320 | 390 |
| $H_2O$ content of feed, percent | 1.7 | 1.7 |
| Product-true specific gravity | 2.07 | 2.02 |
| Yield, percent of theoretical | 97.5 | 97.5 |

As a result of the pretreatment the green coke passed readily through the calciner without sticking to the walls or agglomerating into lumps.

The invention described in conjunction with Figs. 2 and 3 of the accompanying drawings constitutes no part of the invention claimed herein but is the subject matter of my said copending application Ser. No. 408,887.

Having thus described my invention, I claim:

1. A process for making a normally agglutinating green petroleum coke nonagglutinating which comprises heating the green coke to about 700–800° F. and maintaining the coke at that temperature for a period of about 2–4 hours by flowing hot nonreactive gases containing admixed therewith about 1–6% reactive oxygen by volume, in contact therewith, separating the dusty constituent thereof from the treating gases in which entrained during treatment, recycling a portion of the dust-free gases through a heating zone, admixing oxygen-containing gas therewith in the specified proportions, flowing said hot gases in contact with the coke, and cooling and recovering the treated coke.

2. The process of claim 1 in which the reactive oxygen is provided from air.

References Cited in the file of this patent

UNITED STATES PATENTS

| | | |
|---|---|---|
| 1,909,421 | Parr et al | May 16, 1933 |
| 2,219,084 | Tassara | Oct. 22, 1940 |
| 2,420,376 | Johansson | May 13, 1947 |
| 2,560,767 | Huff | July 17, 1951 |
| 2,582,711 | Nelson | Jan. 15, 1952 |
| 2,582,712 | Howard | Jan. 15, 1952 |
| 2,594,226 | Shea | Apr. 22, 1952 |
| 2,675,307 | Klugh et al. | Apr. 13, 1954 |
| 2,677,650 | Welinsky | May 4, 1954 |

FOREIGN PATENTS

| | | |
|---|---|---|
| 515,033 | Great Britain | Nov. 23, 1939 |

OTHER REFERENCES

Roberts, John: "Oxidation and Preheating Systems of Coal Carbonisation," "Coke and Gas," November 1948, pps. 377–380.

"Chemistry of Coal Utilization," vol. I, John Wiley & Sons (1945), Chapter 23 by H. H. Lowry entitled, "Pretreatment of Coal for Carbonization," pps. 848–862.